May 12, 1936.  H. H. McKEE  2,040,148
METHOD OF MARKING MEATS
Filed Dec. 21, 1929
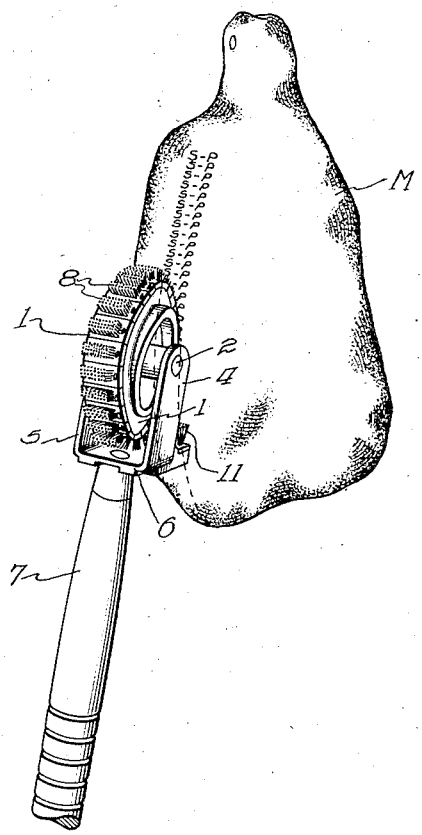
Inventor
Harry Henry McKee.
Witness
Arthur M. Franke.
By Rummler, Rummler + Woodworth
Attys:

Patented May 12, 1936

2,040,148

UNITED STATES PATENT OFFICE 2,040,148

METHOD OF MARKING MEATS

Harry Henry McKee, Chicago, Ill., assignor to Swift and Company, Chicago, Ill., a corporation of Illinois Application December 21, 1929, Serial No. 415,838

8 Claims. (Cl. 101—32)

This invention relates to improvements in methods of marking meats, such as disclosed in my United States Patent No. 1,843,098, entitled Meat stamps, dated January 26, 1932, and which may be carried out with apparatus such as is described and claimed in my said patent.

One of the objects of the invention is to provide an improved method of marking meats. Other objects of the invention will be apparent from the description and claims which follow.

The drawing illustrates one form of apparatus which may be used for carrying out the method of the present invention.

The stamping member, marking cylinder, or roller 1 has a hub 2 journaled in arms 4 and 5 of the U-shaped frame member 6 which has a handle 7.

Marking needles 8 are secured around the periphery of the roller 1 in suitable groups to repeat the desired mark, as the roller is moved along the surface of the meat. The mark is represented in the drawing by the designation S - - - P - - -, which is here merely illustrative of the arrangement of the letters or other indicia that may be used in the place thereof.

In use, as on a piece of meat, M, the markings are placed on the meat by moving the roller down along the side thereof while pressing it against the meat. The amount of penetration of the needles is largely controlled by the rolling action from one group of needles to the next. The needles are preferably not turned to so great an angle, while embedded in the meat, as to cause the edges of the mark to become blurred. The ink is wiped off the ends of the needles as they penetrate the meat and the ink becomes embedded in the tissues near the surface thereof.

The whole length of the meat may be marked with one motion, and the marks are closely spaced, so that each of the cuts from the meat will bear at least some portion of the markings after being severed from the whole piece.

In the apparatus shown in the drawing, the inking brush 11 is placed near the lower part of the roller. This serves to prevent the needles from becoming fouled with ink, since only the ends of the needles are thus moistened with ink, and since the ink is immediately wiped off as the needles pass around into engagement in the surface being marked.

The inventive concept upon which my claims are based relates specifically to the solution of the problem of marking the surface of animal meats, particularly edible animal carcasses or major cuts thereof, from which, as in the case of cattle or sheep, the hide or skin has been removed or as in the case of swine, the skin has been dehaired or removed. I believe I am the first to so mark such products that the wholesaler, the retailer, the consumer and anyone else who might be interested, may readily ascertain the source of fresh, cured or smoked meat whether in carcass form, divided into major cuts or into ordinary consumer cuts such as roasts or steaks. I believe I am the first to so mark such products as to enable the packer to avoid unsightly smearing on fatty surfaces, and to avoid distortion of the desired mark when applied to such products, which by their very nature present irregularities of surface contour. The resultant mark is not defaced by ordinary handling, is legible in spite of division of the product, and by reason of the fact that the minute dots expose but a small quantity of ink, avoids consumer prejudice to the unappetizing spectacle of quantity printing on foodstuffs. Such resultant mark is particularly adapted for marking a whole length of meat, so that separate pieces cut therefrom can be identified by means of the mark thereon, as coming from the same source, and so that each identifying mark will be embedded in the surface of the meat, as is accomplished by the use of the needles of the apparatus herein shown and described, which carry the ink or cause the ink to penetrate below the surface of the meat.

In the device shown the needles revolve in a fixed path so that the various groups of needles imprint the trade-mark or trade-name successively and in parallel relation along the path of the roller.

It is obvious, however, that other forms of apparatus having a different ink-supply device, and otherwise differing from the apparatus herein shown, may be used for putting this method into practice without departing from the spirit of this invention as disclosed herein and defined by the following claims:

I claim:

1. The method of marking edible carcasses from which the hide, skin or hair has been removed which consists in puncturing into and below the surface of the carcass a plurality of like identifying marks arranged in successive order transversely of the lines on which the meat is customarily cut for retailing substantially as and for the purpose described; said marks being of a color contrasting with the color of the surface of the said carcass.

2. The method of preparing meats for market which consists in embedding in the carcass from which the hide, skin or hair has been removed, a plurality of similar identifying marks which are repeated along adjacent successive parts of the meat substantially as and for the purpose herein described; said marks being of a color contrasting with the color of the surface of the said meat.

3. The method of marking meat which consists of pricking into it a band of ink markings running lengthwise of the meat piece and made up of individual indicia arranged along the band whereby the usual subdivision of the piece will disclose such indicia on each section of the meat.

4. The method of marking meat, which consists in applying to a meat piece of wholesale size, a series of identifying markings penetrating the surface of the meat, and arranged in a band extending lengthwise of the piece whereby the piece may be dispensed in retail sizes by parallel cuts with each section displaying one or more of such markings; said markings being of a color contrasting with the color of the surface of the said meat.

5. The method of marking meat which consists of applying thereto a band of markings penetrating the surface of the meat and running lengthwise of the piece and made up of individual indicia of quality arranged along the band whereby the usual subdivision of the piece will disclose such indicia on each section of the meat; said markings being of a color contrasting with the color of the surface of the said meat.

6. The method of marking meat which consists of applying thereto a band of markings penetrating the surface of the meat and running lengthwise of the piece and made up of individual indicia arranged along the band whereby the usual subdivision of the piece will disclose such indicia on each section of the meat; said markings being of a color contrasting with the color of the surface of the said meat.

7. The distributive method of ink-marking meat for identification of subsequent cuts therefrom which consists in systematically applying a row of appropriately spaced specific mark-forming groups of inked punctures to and below the surface of the meat.

8. The method of marking meat which consists in depositing pigment on the walls of minute wells formed in said meat, said wells forming indicia repeated over the surface of said meat and thereafter permitting said wells to close and entrap the pigment deposited on the walls thereof.

HARRY HENRY McKEE.